United States Patent
Quigley et al.

(10) Patent No.: US 6,842,110 B2
(45) Date of Patent: Jan. 11, 2005

(54) INDICATION SYSTEM FOR A VEHICLE

(75) Inventors: John H. Quigley, Northville, MI (US);
Jeff A. Matson, White Lake, MI (US);
Christopher W. Gattis, Livonia, MI (US); Rebecca J. Ford, Farmington Hills, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 169 days.

(21) Appl. No.: 10/263,080

(22) Filed: Oct. 2, 2002

(65) Prior Publication Data

US 2004/0075537 A1 Apr. 22, 2004

(51) Int. Cl.[7] .................................................. B60Q 1/26
(52) U.S. Cl. ..................... 340/468; 340/471; 340/472; 340/479; 340/480; 340/463
(58) Field of Search ................................ 340/468, 471, 340/472, 479, 480, 463, 464; 362/490, 503, 542, 541, 543

(56) References Cited

U.S. PATENT DOCUMENTS

| | | | |
|---|---|---|---|
| 1,674,340 A | 6/1928 | Nock | |
| 4,761,718 A | 8/1988 | Allen | |
| 4,912,607 A | 3/1990 | Kocsi et al. | |
| 4,981,363 A | * 1/1991 | Lipman | 362/503 |
| 5,211,466 A | 5/1993 | Jarocki et al. | |
| 5,255,164 A | * 10/1993 | Eidelman | 362/540 |
| 5,966,073 A | * 10/1999 | Walton | 340/479 |
| 6,067,012 A | 5/2000 | Harding | |
| 6,181,243 B1 | * 1/2001 | Yang | 340/468 |
| 6,380,865 B1 | 4/2002 | Pederson | |
| 6,511,216 B2 | * 1/2003 | Strickland | 362/542 |
| 2002/0048173 A1 | 4/2002 | Schmucker | |

* cited by examiner

Primary Examiner—Hung Nguyen
(74) Attorney, Agent, or Firm—Brinks Hofer Gilson & Lione

(57) ABSTRACT

An indication system is located within the interior of a vehicle to eliminate any drag caused by the system, and is also mounted in a manner which provides a stealth effect. Preferably, the indication system is incorporated into the interior trim. The indication system is also structured to prevent any flashback to the occupants of the vehicle.

26 Claims, 7 Drawing Sheets

INDICATION SYSTEM FOR A VEHICLE

FIELD OF THE INVENTION

The present invention relates generally to indication systems for vehicles such as law enforcement or emergency vehicles, and more particularly relates to an indication system that is discretely packaged.

BACKGROUND OF THE INVENTION

Indication systems are used on many different vehicles including law enforcement vehicles (i.e. police, FBI, secret service, private security cars) and emergency vehicles (i.e. ambulances, fire trucks, etc.). Traditional indication systems utilize a light bar that is mounted to the exterior roof of the vehicle. Unfortunately, these light bars have a significant amount of drag, resulting in a loss of 10 to 15 mph of top vehicle speed. Further, the halogen or fluorescent bulbs utilized in these traditional light bars draw a significant amount of current, causing battery drainage during prolonged use and potential no-start conditions. Finally, these systems are blatantly visible to an outside observer, making their use in undercover vehicles impractical.

In order to overcome these drawbacks, some indication systems have been placed within the vehicle to eliminate the problem of excessive drag. Unfortunately, such current systems interfere with the occupant's field of vision from the interior of the vehicle. For example, not only do these light bars physically obstruct the field of vision, but they also cause a glare on the windshields and windows, commonly known as flashback. Some reflectivity in the glass results in the light from the light bars causing a glare which can significantly obstruct the occupant's field of vision. Additionally, these indication systems are rather large and readily visible from outside the vehicle.

Accordingly, there exists a need to provide an indication system for a vehicle that not only decreases the drag on the vehicle, but also does not impair the occupant's field of vision and is well hidden from the outside observer so that undercover vehicles may not be easily identified.

SUMMARY OF THE INVENTION

The present invention provides an indication system for a vehicle that is incorporated into the interior trim of the vehicle to provide a stealth effect. The indication system includes a light assembly having a plurality of light modules which are preferably LEDs. The light assembly is encased by a cover that is incorporated into the interior trim. In the front and rear windshields, the cover preferably spans from a left trim piece to a right trim piece. Further, an edge of the cover preferably engages either the headliner or the rear package tray, while the opposing edge extends along the windshield. Side light assemblies may be employed which are incorporated into the trim covering the B-pillars, or into the trim at the base of a side window.

The present invention preferably includes a mechanism to prevent flashback in the vehicle. Generally, the free edge or edges of the cover which extend along the windshield or window have a gasket attached thereto. The gasket contacts the windshield or window to prevent the reflection of light off the windshield or window.

BRIEF DESCRIPTION OF THE DRAWINGS

The accompanying drawings incorporated in and forming a part of the specification illustrate several aspects of the present invention, and together with the description serve to explain the principles of the invention. In the drawings:

FIG. 2a is a cross-sectional view of the light bar depicted in FIGS. 1 and 2, taken about the line 2a—2a;

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Turning now to the figures, the present invention provides an indication system that is located within the interior of the vehicle to eliminate any drag caused by the system, and is also mounted in a manner which provides a stealth effect. Furthermore, the indication system prevents any flashback to the occupants of the vehicle.

Figure 11:
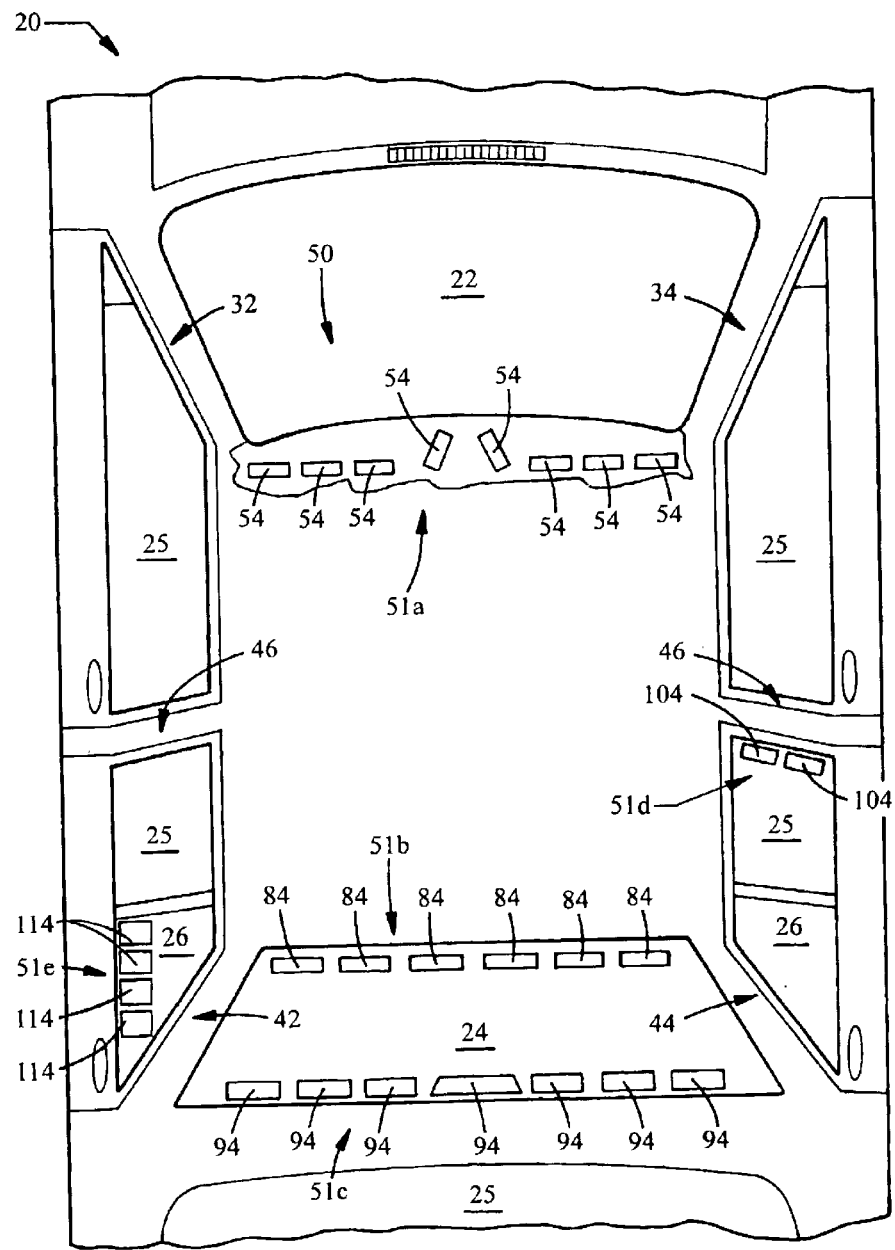
FIG. 11 is a schematic plan view showing the indication system of the vehicle.

As best seen in FIG. 11, a vehicle 20 includes a front windshield 22, a rear windshield 24, and a plurality of side windows 25, 26. An indication system 50 of the present invention includes at least one light bar connected to the vehicle 20 proximate a windshield or window. As depicted, the indication system 50 includes a front light bar 51a, a rear upper light bar 51b, a rear lower light bar 51c, and at least two side light bars, which can be of either the type denoted by reference numeral 51d, or the type denoted by reference numeral 51e. Each of the light bars 51a, 51b, 51c, 51d, 51e includes a number of light modules 54, 84, 94, 104, 114, respectively, which are operatively connected to a common controller 15 (FIG. 5) for coordination. The controller can operate the light modules for directional lighting, flash patterns or the like.

Figure 1:
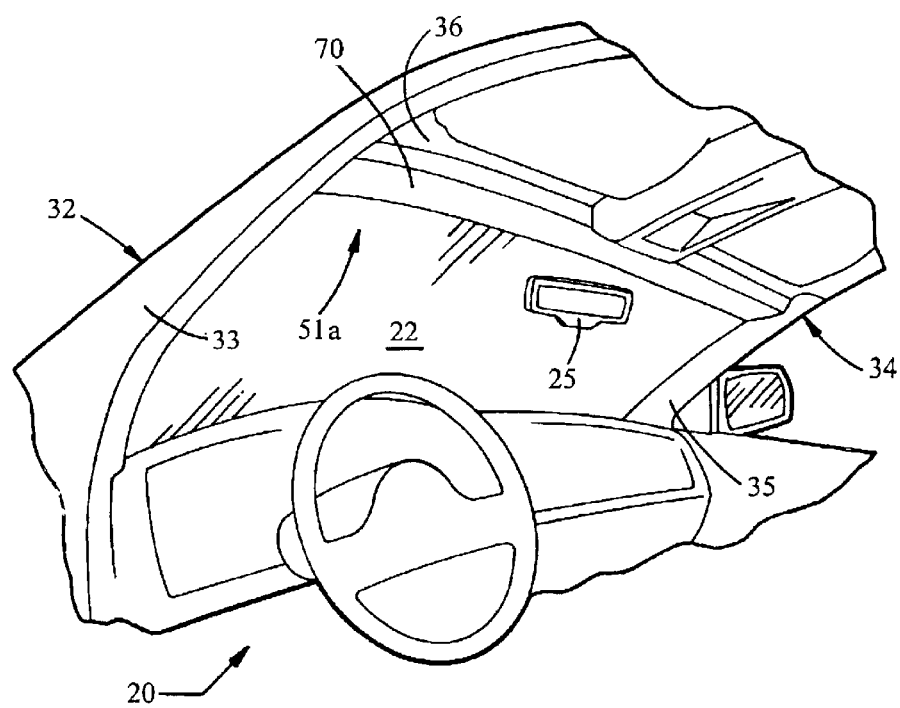
FIG. 1 is a perspective view from inside a vehicle having a light bar attached proximate the front windshield of the vehicle constructed in accordance with the teachings of the present invention.
Figure 2:
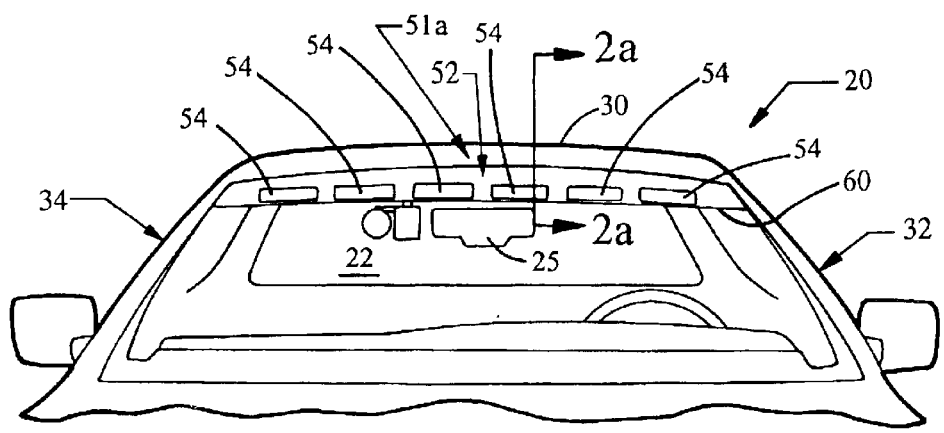
FIG. 2 is a front view of the vehicle having the light bar shown in FIG. 1.
Figure 2A:
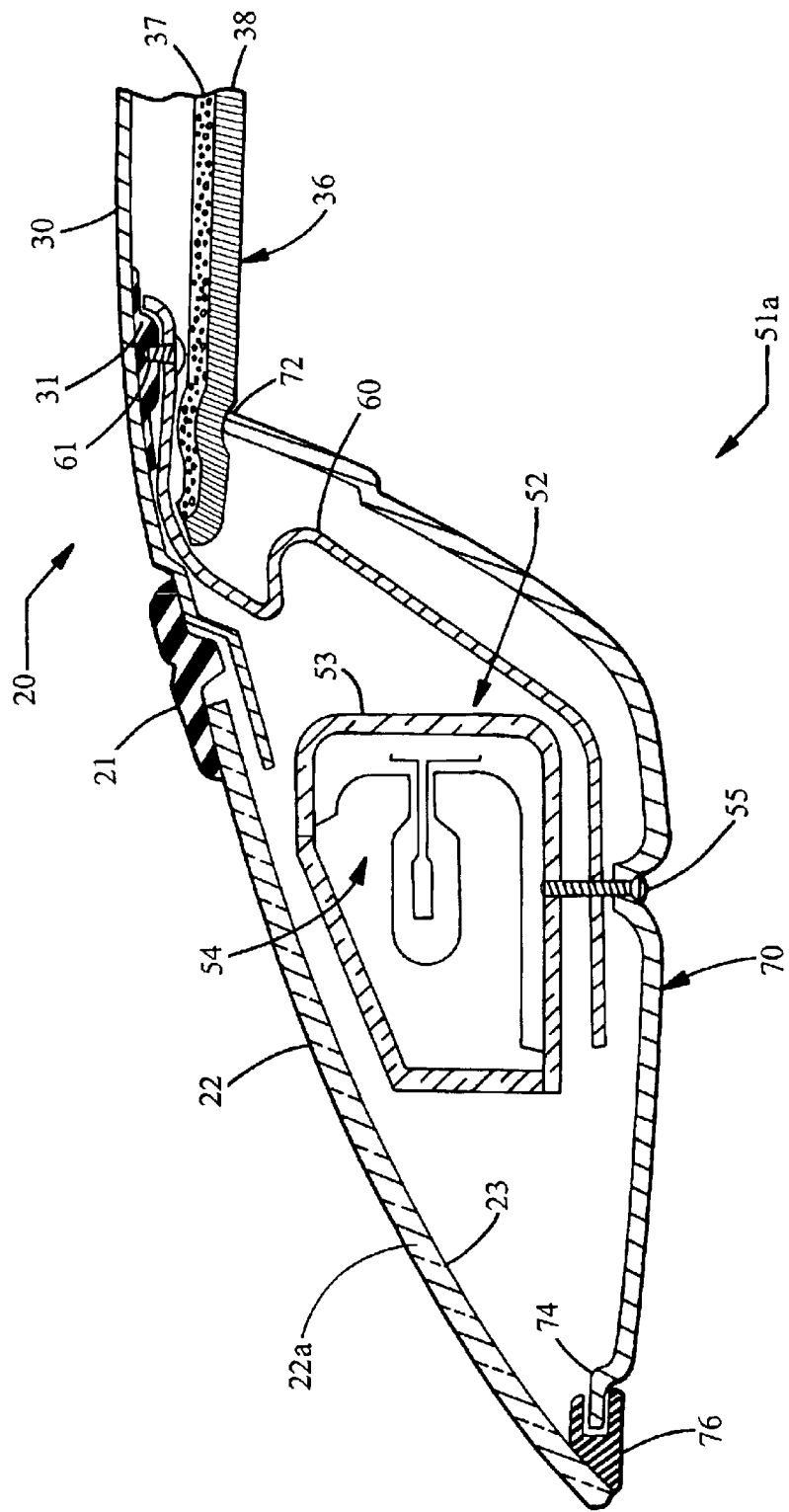

As shown in FIGS. 1, 2, and 2a, the vehicle 20 includes a light bar 51a located proximate the front windshield 22. The vehicle support structure generally includes a left A-pillar 32 and a right A-pillar 34. Within the vehicle, the A-pillars are typically covered by a left trim piece 33 and a right trim piece 35. The vehicle's interior trim also includes a headliner 36 covering the roof 30 (FIGS. 2 and 2a) of the vehicle. The front light bar 51a includes a light assembly 52 having a cover 70 which is used to blend the light bar 51a into the interior trim, as will be described herein. It can be seen that the vehicle includes a rearview mirror 25. The light bar 51a is located above the rearview mirror 25 along an upper portion of the front windshield 22.

As best seen in FIG. 2a, the light assembly 52 is attached to the interior of the vehicle 20. More specifically, the light assembly 52 has a plurality of light modules 54 each having their own housing 53. Preferably, the light modules 54 are LED's (light emitting diodes) which draw approximately 10 amps or less. Each light assembly 52 may incorporate any combination of blue, red, and/or amber LED's or light modules 54 depending upon the particular application.

A bracket 60 is utilized to attach each light module 54 to the vehicle 20. Typically, the vehicle 20 includes a roof 30 which is constructed of a sheet metal or similar structure. An exterior glass seal 21 connects the roof 30 to the front windshield 22. The roof 30 is supported by at least one support bar 31 attached to the underside thereof. The headliner 36 generally includes a foam material 37 layered atop a fabric material 38, the headliner 36 covering the majority of the roof 30. The bracket 60 is attached to the support bar 31, typically by a fastener such as a threaded fastener 61 as shown. The bracket 60 extends forwardly around the headliner 36, and then extends downwardly and then forwardly to provide a mounting surface for the light assembly 52. A threaded fastener 55 is typically used to attach the housing 53 of the light module 54 to the bracket 60. By attaching the light assemblies to the vehicle 20 using the same support mechanisms as the interior trim, (i.e. such as by using the support bar 31 in the roof) the light assemblies may be easily removed from the vehicle when the vehicle is removed from use as a law enforcement or emergency vehicle, facilitating after market utilization of the vehicle.

The light assembly 52, including modules 54 and brackets 60, is encased by a cover 70. The cover 70 is preferably attached to the bracket 60 and light assembly 52 by way of the same fasteners 55 used to connect the prior two structures. The cover 70 includes an upper edge 72 and a lower edge 74. The upper edge 72 preferably contacts the headliner 36 in a manner to slightly compress the same, thereby preventing any leakage of light from the light assembly 52. The lower edge 74 extends along the front windshield 22. Lower edge 74 includes a gasket 76 attached thereto, the gasket 76 in turn contacting the interior surface 23 of the front windshield 22. The gasket 76 is preferably an opaque rubber material which is compressed against the windshield 22, to prevent any light leakage. Not only does the gasket prevent flashback, it also reduces the amount of wasted light and hence focuses more light in the intended direction to provide a bright indication system.

Referring back to FIG. 1, it can be seen that the light bar 51a, including the light assembly 52 and the cover 70, provide a small package which does not physically obstruct the view of the driver or occupant of the vehicle 20. Furthermore, the indication system 50 is uniquely incorporated into the interior trim of the vehicle 20 to provide a stealth effect. That is, the cover 70 spans from the left trim piece 33 to the right trim piece 35, while also engaging the upper headliner 36. Side edges of the cover 70 contact the trim pieces 33, 35, while the upper edge 72 contacts the headliner 36. Preferably, the cover 70 is of a plastic material and is colored similarly to the color of the interior trim to make it appear as a natural part of the vehicle.

Additional factors may also increase the stealth effect provided to the light bar 51a. The vehicle 20 preferably includes a front windshield 22 having an upper portion 22a (FIG. 2a) tinted to assist in preventing driver blindness from the sun. Preferably, the light bar 51a and the light assembly 52 are located in an area of the windshield 22 that overlaps the tinted portion 22a of the windshield 22. This provides for an increased stealth effect of the indication system 50 when viewed from outside the vehicle 20.

Figure 3:
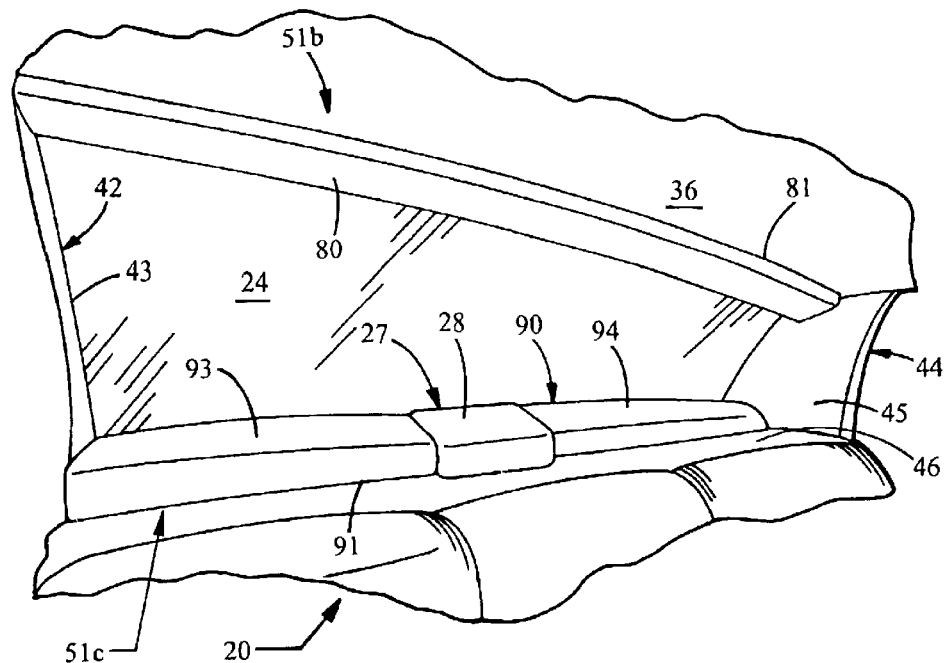
FIG. 3 is a perspective view, taken from within the vehicle, of a pair of rear light bars attached to the vehicle adjacent a rear windshield, constructed in accordance with the teachings of the present invention.
Figure 4:
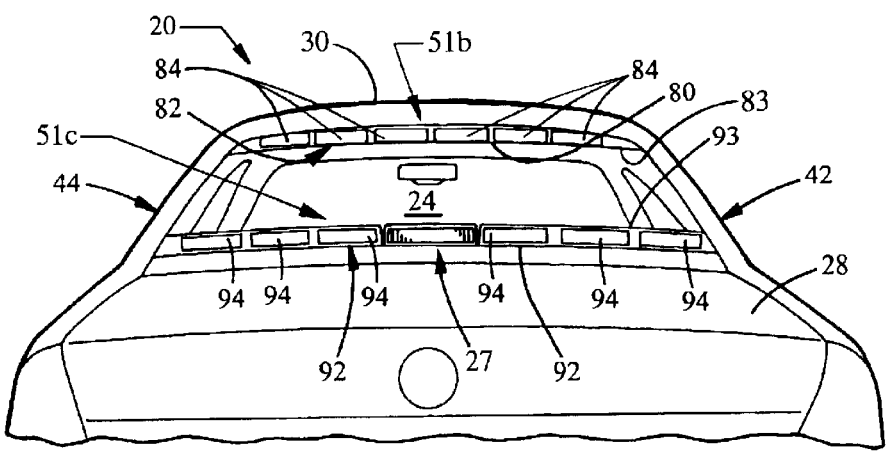
FIG. 4 is a rear view of the vehicle having the pair of rear light bars shown in FIG. 3.

Turning now to FIGS. 3 and 4, a partially cut-away perspective view from the interior, and a rear view of the vehicle 20 are shown, respectively. The indication system 50 includes a rear upper light bar 51b and a rear lower light bar 51c. The upper light bar 51b includes an upper rear light assembly 82 encased by an upper rear cover 80. The lower light bar 51c includes a lower rear light assembly 92 encased by a lower rear cover 90. The light assemblies 82, 92 are substantially identical to the front light assembly 52 previously described.

As best seen in FIG. 3, the vehicle 20 includes a right C-pillar 42 and a left C-pillar 44. The right C-pillar 42 is covered by a right rear trim panel 43 and the left C-pillar 44 is covered by a left rear trim panel 45. Again, the headliner 36 covers the roof 30 of the vehicle 20. A rear package tray 46 comprises a portion of the interior trim and spans between the right and left rear trim pieces 43, 45.

Generally, the upper rear light bar 51b is substantially identical to the front light bar 51a, previously described. A plurality of light bars 84 are supported by appropriate bracketry, and generally form rear upper light assembly 82. The cover 80 spans from the right trim piece 43 to the left trim piece 45, and includes side edges contacting the same. An upper edge 81 of the cover 80 engages the headliner 36. A lower edge 83 of the cover 80 engages the rear windshield 24, and includes a gasket (not shown) identical to the previously described gasket 76 for preventing flashback.

The light bar 51c and its light assembly 92 is similar to light bar 51a previously described, except that the lower rear light assembly 92 is directly affixed to the rear package tray 46, preferably by way of a threaded fastener. The lower rear cover 90 encasing the lower rear light assembly 92 is preferably incorporated into a high mount brake light 27 of the vehicle 20. The high mount brake light includes a cover 28 encasing the brake light. Preferably, the housing 90 includes a left housing 94 and a right housing 93 on opposing sides of the high mount brake light 27 and its cover 28, although a single cover could completely overlay the brake light 27. The lower rear cover 90 is preferably of a material and color that matches the cover 28 of the high mount brake light 25 and the rear package tray 46. The rear lower cover 90 spans from the right trim piece 43 to the left trim piece 45, while a lower edge 91 contacts the package tray 46 and an upper edge 93 has a gasket (not shown) contacting the rear windshield 24.

Figure 5:
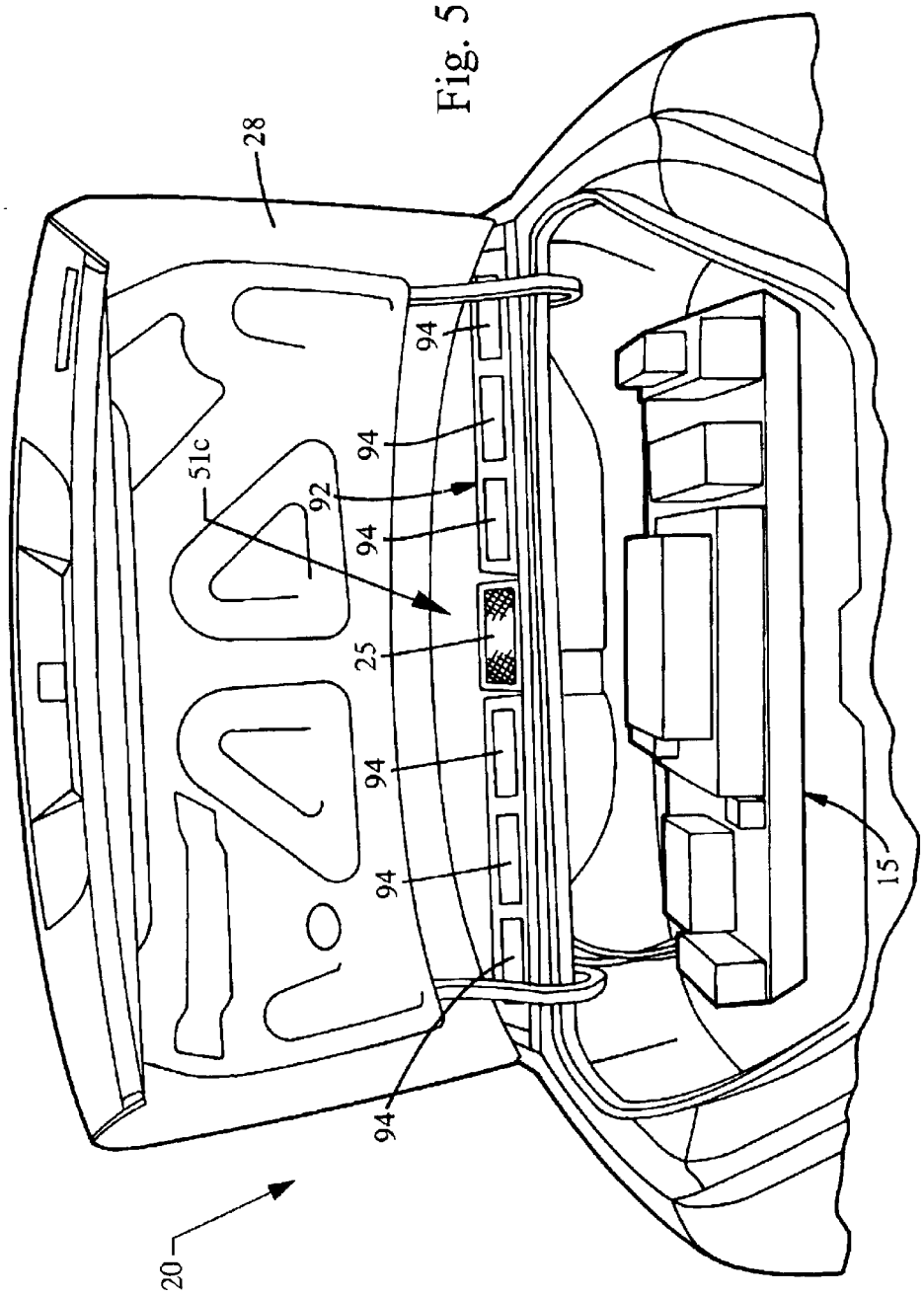
FIG. 5 is a rear view similar to that of FIG. 4, showing the trunk hood in an open position.

As best seen in FIG. 4, the upper rear light assembly 82 includes a plurality of light modules 84. Similarly, the lower rear light assembly 92 includes a plurality of light modules 94 spanning the rear windshield 24. If desired, the rear windshield 24 may include tinted portions along its upper and lower edges in an area which overlaps the upper and lower rear light assemblies 82, 92. As shown in FIG. 5, even when the trunk hood 28 of the vehicle is moved from its closed position (shown in FIG. 4) to its open position as shown in FIG. 5, the lower light bar 51c can still be seen from the rear of the vehicle. As also shown in FIG. 5, a controller 15 may be located in the trunk which is operatively connected to all of the light modules forming a part of the indication system 50.

For example, directional lighting may be outputted by the controller 15, and the light modules will show the effect that the light is appearing to be moving to the left or to the right, indicating that other drivers are to go around the vehicle 20. Flash patterns may be also generated by the controller 15 to correspond to the particular application, i.e. a police vehicle or an ambulance. When both the upper rear light bar 51b and the lower rear light bar 51c are mounted to a vehicle 20, the upper light assembly 51b may be used for directional lighting, while the lower rear light assembly 51c may be used to generate flash patterns. Of course, any combination of light colors, location, and flashing patterns may be used depending on particular requirements or applications.

Figure 6:
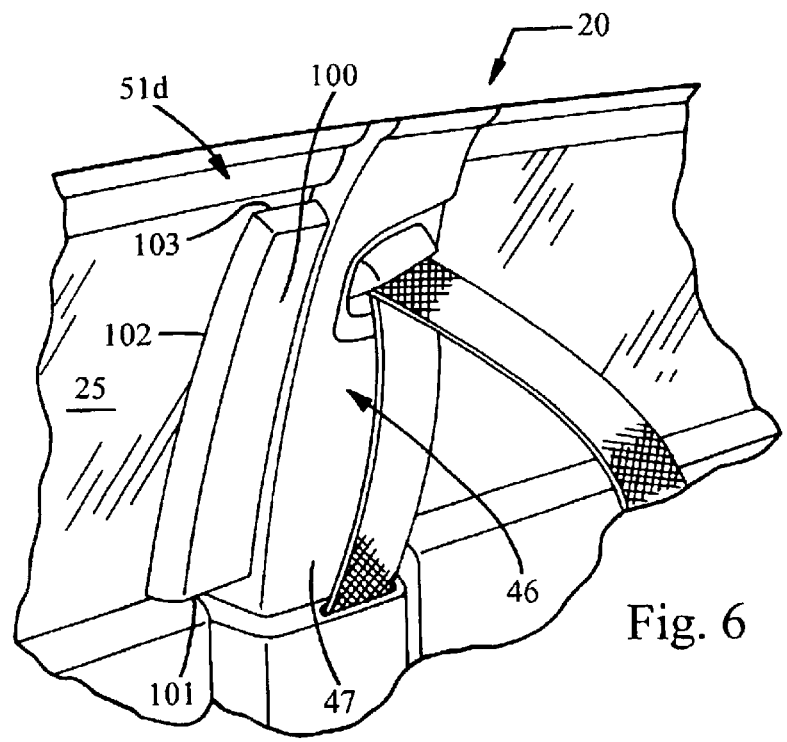
FIG. 6 is a perspective view, taken from within the vehicle, showing a light bar incorporated into the vehicle adjacent a side window.

Turning now to FIG. 6, the vehicle 20 also includes a B-pillar 46 having a side trim panel 47 covering the same. The indication system 50 includes a side light bar 51d having a plurality of light modules 104 (FIG. 11) encased by a side cover 100. Preferably, the side cover 100 is incorporated into the interior trim, and more particularly the side trim panel 47. The cover 100 includes a side edge 102 as well as an upper edge 103 and a lower edge 101. Preferably, the edges 101, 102, 103 have a gasket (not shown) similar to the gasket 76 previously described, which engages a side window 25 to prevent flashback.

Figure 7:
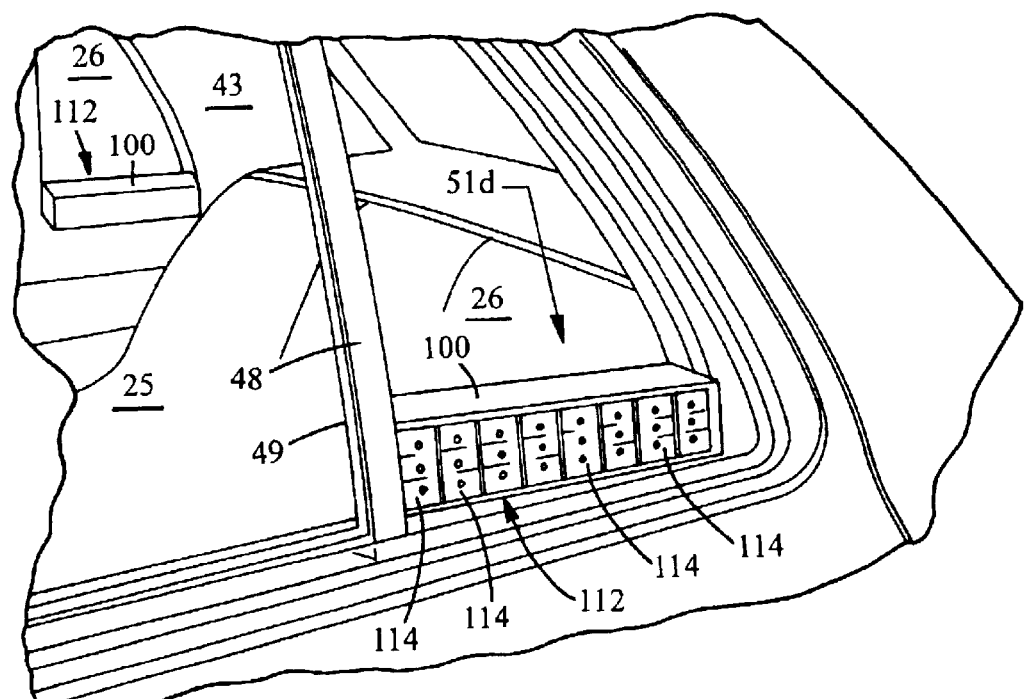
FIG. 7 is another embodiment of a light bar incorporated into the vehicle adjacent a side window, taken from outside the vehicle.

FIG. 7 depicts another embodiment of a side light bar 51d having a side light assembly 112 and a cover 110 encasing the same. This side light bar assembly 112 includes a plurality of light modules 114 which are suitably attached to the vehicle 20. This light assembly 112 and cover 110 are incorporated inside the vehicle at a rear window 26 adjacent the side window 25 previously described. The window 26 is typically an immovable window forming a part of a rear side window and door of the vehicle 20. The cover 110 is incorporated into the interior trim and engages a rear left or right trim pieces 43, 45 and a trim piece 49 on the interior of a bar 48 separating the windows 25, 26.

The indication system 50 preferably includes first, second, third, and fourth light bars such as the front light bar 51a, one of the rear light bars 51b or 51c, and two opposing side light bars such as light bar 51d or 51e, as shown in FIG. 11. The combination of these four light bars will provide an indication system 50 which is viewable from 360 degrees around the vehicle 20. Preferably, the controller 15 is operatively connected to each of the light modules of the first, second, third, and fourth light bars for coordinating the indication system 50. Preferably, the light modules 54 of the front light assembly 52 faced forwardly, while the rear light modules (84 and/or 94) of the rear light assembly (assembly 82 and/or 92) faced rearwardly. Similarly, the side light assemblies (102 and/or 112) include light modules (104 and/or 114) which face opposing sides of the vehicle 20.

It will be recognized that each of the individual light modules may be faced in somewhat different directions. For example, it has been found preferable to angle an inner light module 54 of the front light assembly 52 forwardly and to the left, while facing another inner light module 54 of the light assembly 52 forwardly and to the right, as shown in FIG. 11. The angling of these light modules 54 assists in viewing the indication system 50 from the sides of the vehicle 20. Preferably, the two inwardmost modules are angled at about 30 to 60 degrees relative to a straight forward direction.

Figure 8:
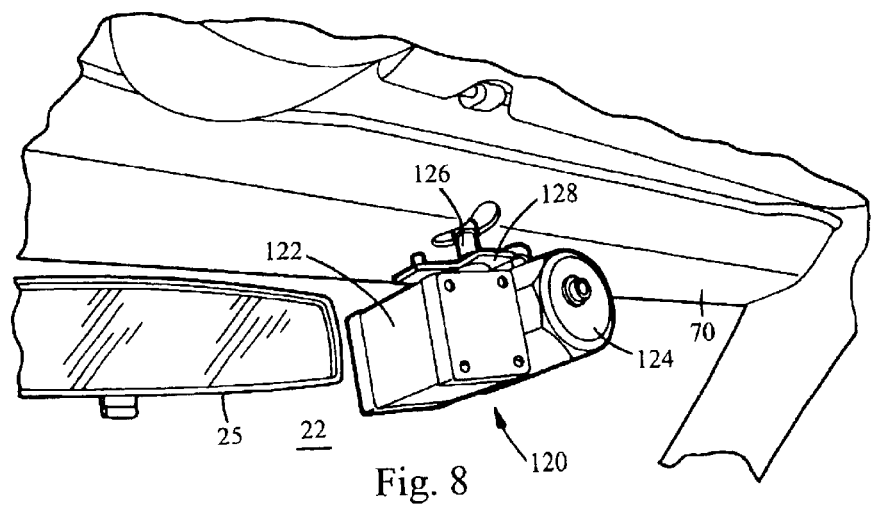
FIG. 8 is a perspective view, taken from within the vehicle, showing a recording assembly incorporated into a light bar positioned adjacent the front windshield.
Figure 9:
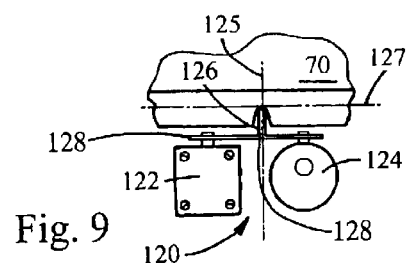
FIG. 9 shows a rear view of the recording assembly shown in FIG. 8.
Figure 10:
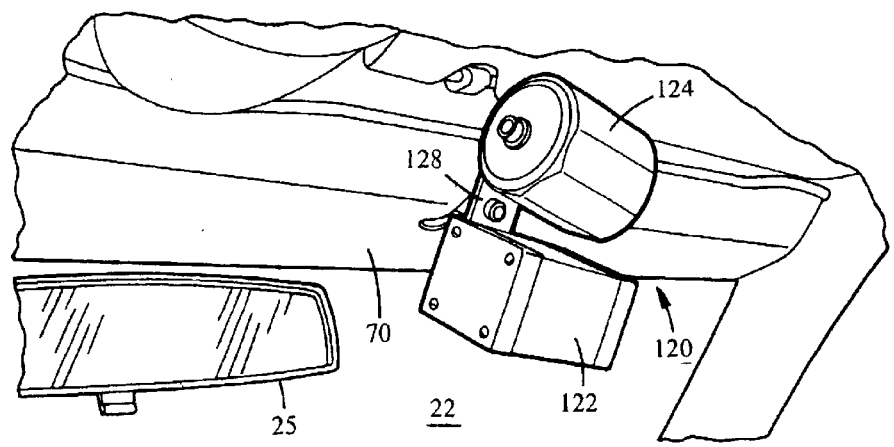
FIG. 10 is a perspective view, taken from within the vehicle, showing the recording assembly of FIGS. 8 and 9, but depicting the assembly in a withdrawn position.

Turning now to FIGS. 8–10, another aspect of the present invention has been depicted. A recording assembly 120 has also been incorporated into the front light bar 51a. More particularly, the recording assembly 120 includes a video camera 122 and a radar antenna 124. It will be recognized that the recording assembly 120 may include only one of the video camera 122 and the radar antenna 124.

As best seen in FIG. 9, the video camera 122 and radar antenna 124 are connected to each other by way of a connection bar 128. The connection bar 128 is rotatably attached to a pivot bar 126, which extends through the cover 70 and is attached to the bracket 60. The pivot bar 126 could also attach to any other vehicle structure as will be recognized by those skilled in the art. Accordingly, the video camera 122 and radar antenna 124 can rotate about a generally vertical axis 125 defined by the pivot bar 126. It will be understood that this axis 125 may be slightly rotated from a vertical orientation. Furthermore, the pivot bar 126 rotates about its connection to the vehicle generally defined by a generally horizontal axis 127.

As shown in FIG. 10, the structure permits the recording assembly 120 to be rotated out of the way and generally hidden behind the front cover 70. In this withdrawn position, the recording assembly 120 is easily concealed. Briefly, from the extended position shown in FIG. 8, the recording assembly 120 is rotated about the pivot bar 126 and axis 125 so that one of the video camera 122 and radar antenna 124 are placed in front of the other. Then, the recording assembly 120 is rotated upwardly by virtue of the pivotal connection between the vehicle 20 and the pivot bar 126. It will be seen that when the pivot bar 126 moves relative to the vehicle 20, the axis 125 about which the recording assembly 120 rotates is shifted. In this manner, the recording assembly 120 may quickly and easily be put in an extended position for active use, or placed into a withdrawn position when the assembly 120 is not needed, while still concealing the recording assembly 120.

Not only does the gasket prevent flashback, it also reduces the amount of wasted light and hence focuses more light in the intended direction to provide a bright indication system.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. Art indication system for a vehicle, the vehicle having a windshield and interior trim, the interior trim including a headliner covering a roof panel a pair of left and right trim pieces covering left and right pillars, the indication system comprising:

a light assembly connected to the vehicle proximate the windshield, the light assembly including a plurality of light modules for indication;

a cover encasing the light assembly and incorporated into the interior trim for providing a stealth effect to the indication system, the cover including left and right edges abutting the left and right trim pieces, the cover including an upper edge abutting the headliner and a lower edge extending along the windshield;

a bracket connected to the roof panel between the roof panel and headliner, the bracket extending forwardly around the headliner and downwardly from the roof, the cover attached to the bracket.

2. The indication system of claim 1, the interior trim having a color, wherein the cover has a color similar to the color of the trim to enhance the stealth effect.

3. The indication system of claim 1, the windshield including a tinted portion, wherein the light assembly spans an area of the windshield overlapping the tinted portion for enhancing the stealth effect.

4. The indication system of claim 1, the windshield being a front windshield having a rear view mirror, wherein the light assembly and cover are positioned above the rear view mirror.

5. The indication system of claim 1, wherein the lower edge of the cover has a gasket attached thereto, the gasket contacting the windshield to prevent flashback from the light assembly.

6. The indication system of claim 1, the headliner covering a support bar attached to the roof panel, wherein the bracket is attached to the support bar.

7. The indication system of claim 1, wherein the light assembly is also attached to the bracket.

8. The indication system of claim 7, wherein the light assembly is attached to the bracket using a fastener, and wherein the cover is attached to the bracket using the same fastener.

9. The indication system of claim 7, further comprising a radar antenna attached to the vehicle via a pivot bar, the radar antenna rotating about a generally vertical axis defined by the pivot bar, the pivot bar rotating about a generally horizontal axis defined by the bracket.

10. The indication system of claim 9, further comprising a video camera coupled to the radar antenna by a connection bar, the connection bar being rotatably attached to the pivot bar.

11. An indication system for a vehicle, the vehicle having a window and interior trim, the indication system comprising:

a light assembly connected to the vehicle proximate the window, the light assembly including a plurality of light modules for indication;

a cover encasing the light assembly, the cover including an edge extending along the window and having a gasket attached thereto, the gasket contacting the window to prevent flashback from the light assembly; and a recording assembly comprising a radar antenna attached to a video camera, the recording assembly pivotally attached to the vehicle by a pivot bar for rotation about an axis generally parallel to the cover, the recording assembly rotatable between an extended position where the radar antenna and video recorder are aligned with an uncovered portion of the window for active use, and a withdrawn position where a majority of the radar antenna and video recorder are aligned with the cover for concealing the recording assembly.

12. The indication system of claim 11, wherein the edge of the cover is one of an upper edge and a lower edge.

13. The indication system of claim 12, wherein the cover includes left and right edges, the gasket being attached to the left and right edges of the cover.

14. The indication system of claim 11, the window being a rear windshield, the interior trim including a rear package tray situated below the rear windshield, wherein the light assembly is attached to the package tray.

15. The indication system of claim 14, the vehicle including a high mount brake light positioned above the rear package tray and proximate the rear windshield, wherein the cover is incorporated into the high mount brake light to provide a stealth effect.

16. The indication system of claim 14, the vehicle including a trunk hood pivotable between open and closed positions, the light assembly being visible from behind the vehicle when the trunk hood is in the open position.

17. The indication system of claim 14, further comprising a second light assembly and a second cover encasing the light assembly, the second cover including an edge extending along the rear windshield and having a gasket attached thereto, the gasket contacting the windshield to prevent flashback from the second light assembly.

18. The indication system of claim 17, wherein the first and second light assemblies are vertically spaced apart.

19. The indication system of claim 17, the rear windshield including a first tinted portion and a second tinted portion, wherein the first light assembly spans an area of the windshield overlapping the first tinted portion and the second light assembly spans an area of the windshield overlapping the second tinted portion for enhancing the stealth effect.

20. An indication system for a vehicle, the vehicle having a front windshield, a rear windshield, a right side window, a left side window and interior trim, the indication system comprising:

a first light assembly connected to the vehicle proximate the front windshield, the first light assembly including a plurality of light modules for indication, the plurality of light modules including a set of modules facing forwardly, at least one light module angled forwardly and to the right, and at least one light module angled forwardly and to the left;

a second light assembly connected to the vehicle proximate the rear windshield, the second light assembly including a plurality of light modules for indication;

a third light assembly connected to the vehicle proximate the right side window, the third light assembly including a plurality of light modules for indication;

a fourth light assembly connected to the vehicle proximate the left side windshield, the fourth light assembly including a plurality of light modules for indication;

a controller operatively connected to the light modules of the first, second, third and fourth light assemblies for coordinating the indication system and providing a 360 degree visibility of the indication system.

21. The indication system of claim 20, further comprising a first cover encasing the first light assembly, a second cover encasing the second light assembly, a third cover encasing the third light assembly, a fourth cover encasing the fourth light assembly, each of the first, second, third, and fourth covers being incorporated into the interior trim.

22. The indication system of claim 21, wherein the third and fourth covers are incorporated into the trim at the base of the right and left windows, respectively.

23. The indication system of claim 20, wherein the first, second, third and fourth light assemblies are capable of independent operation.

24. The indication system of claim 20, wherein the at least one light module angled forwardly and to the right and the at least one light module angled forwardly and to the left are angled at about 30 to 60 degrees.

25. The indication system of claim 1, wherein the bracket further extends forwardly towards the windshield after extending downwardly, the cover being attached to the portion of the bracket extending forwardly towards the windshield.

26. the indication system of claim 1, wherein the upper edge compresses the headliner to prevent light from escaping therebetween.

* * * * *

UNITED STATES PATENT AND TRADEMARK OFFICE
CERTIFICATE OF CORRECTION

PATENT NO. : 6,842,110 B2
DATED : January 11, 2005
INVENTOR(S) : John H. Quigley et al.

It is certified that error appears in the above-identified patent and that said Letters Patent is hereby corrected as shown below:

Column 6,
Line 60, before "indication" delete "Art" and substitute -- An -- in its place.

Signed and Sealed this

Twelfth Day of July, 2005

JON W. DUDAS
*Director of the United States Patent and Trademark Office*